United States Patent Office 3,370,344

Patented Feb. 27, 1968

3,370,344

METHOD OF BONDING ALKALI METALS TO CONVENTIONAL CONDUCTORS

George Feick III, Needham, and Paul Edward Doherty, Lexington, Mass., assignors, by mesne assignments, to Simplex Wire and Cable Company, Cambridge, Mass., a corporation of Massachusetts No Drawing. Filed Aug. 17, 1965, Ser. No. 480,480
8 Claims. (Cl. 29—502)

This invention relates to electrical conductors and more particularly to a method of joining conductors made from alkali metals, alkaline earth metals and alloys and mixtures thereof with other more conventional conductors.

Alkali metals, alkaline earth metals and alloys and mixtures thereof represent an abundant source of electrically conductive materials. However, their high reactivity creates problems in effecting contact with other metals. The normal presence of a layer of oxidized metal at surfaces of such conductors, for example, results in high contact resistance at joints between such conductors and other metals, such as copper. Moreover, physical contact alone does not provide an effective joint.

It is an object of this invention to provide a method for joining such "special" conductors made of alkali metals, alkaline earth metals or alloys and mixtures thereof, with more conventional conductors such as copper, whereby a low contact resistance may be attained by means of an inter-metallic bond.

It is a further object of this invention to provide a method of effecting contact with such special conductors whereby the presence of an interface of oxidized metal is avoided.

These and other objects are accomplished by a joining special conductor made from an alkali metal, an alkaline earth metal or an alloy or mixture thereof, with a more conventional conductor by means of an intermediate layer of a metal which alloys with both conductors at relatively low temperatures. For example, a sodium conductor can be joined to a copper conductor by first coating the end of the copper conductor with a film of mercury, and then bringing the copper conductor into intimate contact with the sodium conductor at normal ambient temperatures for a period sufficient for the mercury to form an amalgam with each of the sodium and the copper conductors. Mercury is a particularly desirable intermediate metal because it acts as a lubricant for effecting the intimate contact desired, and also because it forms amalgams with many metals at room temperature.

The "conventional" conductors which can be joined to the above described special conductors in accordance with this invention are the more common electrical conductors such as copper, tin plated copper, silver, gold, silver and gold plated copper and other electrical conducting metals and alloys. Plating of conductors is particularly useful where the metal of the conductor is likely to be adversely affected by the intermediate metal contemplated. For example, aluminum is severely attacked by mercury and, therefore, should not be contacted directly with it. Thus, when an aluminum conductor is joined to a special conductor by means of an intermediate layer of mercury the surface of the aluminum is plated, e.g., with tin, in the area of the joint, thereby presenting a surface of contact with the mercury which is not adversely effected by it.

In using the method of the present invention it is important that mechanical stresses across the joint be avoided after a bond is formed between the intermediate metal and the two conductors, as this bond can be broken, substantially increasing the resistance of the joint. Once the bond has been broken it demonstrates no tendency to be self-healing.

The joining of a sodium conductor to a copper conductor provides a good example of the present invention although numerous variations of the conductor materials involved will be obvious. Copper and sodium do not alloy with each other; mercury, on the other hand, forms an amalgam with each of sodium and copper at room temperatures. Therefore, a thin film of mercury on a copper conductor to which a sodium conductor is to be joined renders the copper conductor capable of making a low resistance bond with the sodium conductor at room temperatures.

To demonstrate the amalgamating action of the mercury in forming the contact between a sodium and a copper conductor, a copper wire was cleaned and dipped into acidic mercuric nitrate. Upon removal of the wire from the solution a visible film of mercury was deposited on the surface of the wire. The wire was rinsed with water and dried, and an end of the wire was pressed into a block of sodium. Soon after thus embedding the mercury coated wire into the sodium, the wire was withdrawn, and the embedded portion inspected. In some areas sodium was found to have adhered to the wire and had been torn from the block, while in other areas the mercury coating was stripped from the copper wire leaving the red copper visible.

The above indicates that in the short time that the wire was embedded in the sodium block, sodium became bonded to the copper wire in some areas with sufficient strength that the sodium metal tore rather than broke its bond with the copper. In other areas the sodium clung so strongly to the mercury that the latter was completely removed from the surface of the copper wire. After inspection, the freshly withdrawn wire was immersed in water, and the sodium coating immediately reacted with the water releasing mercury which in turn re-coated the entire surface of the copper wire.

A second mercury coated copper wire was embedded in a block of sodium and left in the block overnight. The next morning the wire could be removed from the sodium only with great force and upon inspection it was found that sizable portions of the sodium clung to the wire tenaciously. When this wire was immersed in water the adhering sodium dissolved leaving a bare red copper wire with no indication of the presence of mercury.

A third mercury coated copper wire was embedded in a block of sodium and allowed to stand overnight. Electrical current was passed through the sodium and the copper, and resistance measurements were made. Thereafter the copper wire was deliberately turned relative to the sodium thereby fracturing the amalgamated joint. Further passage of electric current through the sodium and copper wire showed marked increase in the electrical resistance of the joint further evidenced by excessive local heating in the vicinity of the contact. The damaged contact displayed no tendency to be self-healing, and thus it is imperative that joints made according to this invention be protected from subsequent mechanical stress which may cause fracture of the amalgamated bond between the conductors.

In order to establish an experimental value for the mercury-copper-sodium system surface resistance, a test jig was set up which allowed at least 5% accuracy in the measurement of current, voltage, and length. A regulated voltage supply and a .1 ohm resistor of high precision and large current capability comprised a current source. A potentiometer was used to measure the micro- to millivolt level potentials present on the test cable. Contact was made to the sodium by means of cylindrical copper rods, having a diameter less than the ID of the cable. After machining, the copper was degreased and coated with mercury in a bath consisting of mercuric-nitrate and nitric acid. The rods were forced against the sodium and held by the jig. The resistance per unit length of the test cable was measured by inserting two copper pins into the sodium conductor; the value obtained agreed closely with theory. Measurement of the voltage across the cable and contacts, at known current, leads directly to the contact resistance present. A consistent resistivity of 2.3 to 2.7 micro ohm $cm.^2$/contact was obtained by this method.

The use of mercury in effecting contact between an alkali or alkaline earth metal and a more conventional electrical conductor is particularly advantageous for several reasons. The ability of mercury to form amalgams at room temperature makes it possible to effect contact with an insulated conductor without damage to the insulation which often is sensitive. It has also been observed that the presence of mercury at the point of contact reduces the affinity of the alkali and alkaline earth metals for oxygen. Further, mercury has a lubricating property which facilitates the intimate contact required for the realization of low contact resistance. Finally mercury can be deposited on a metallic surface by simply dipping the surface into an acidic solution of a salt of mercury such as mercuric nitrate.

Although mercury is a particularly advantageous intermediate metal for the reasons given above the use of other intermediate metals is within the scope of this invention. The metals which can be used as intermediate metals in the joining of special conductors with more conventional conductors in accordance with this invention are those metals (and alloys) which alloy with each of the conductors at temperatures below those at which the conductors form alloys with each other, if they do so.

Further, while it has been disclosed herein that a thin layer of mercury can be deposited on a conductor by dipping the conductor into an acidic mercuric nitrate solution, a suitable layer of mercury can alternately be provided by merely bringing the conductor into physical contact with liquid mercury metal. Any other means of metallic deposition can also be used including, but not limited to, electroplating and electrodepositing. It is important that the surface of contact, on which the layer of intermediate metal is deposited be thoroughly cleaned beforehand as the presence of impurities thereon can retard and even prevent the formation of an alloy between the metal of the conductor plated and the intermediate metal.

The present invention is useful in joining a large variety of conductors and is not limited to conductors which are immiscible under all conditions, e.g., sodium and tin form alloys at elevated temperatures but can be joined at reduced temperatures according to the present invention. Furthermore, the present invention can be used to join plated conductors to alkali or alkaline earth metal conductors by means of an intermediate alloying or amalgamating metallic layer, thereby introducing a fourth metal to the overall composite. Tin plated copper, for example, is frequently used as a conductor because of its increased resistance to atmospheric attack and the present invention is suitable for joining such a conductor to a sodium or other alkali or alkaline earth metal conductor across a mercury layer.

We claim:

1. The method of joining a first electrical conductor of a metal selected from the group consisting of alkali metals, alkaline earth metals and alloys and mixtures thereof, to a second electrical conductor having a metallic surface of contact by interposing between said first electrical conductor and said surface of contact a layer of mercury which alloys with the metal of said first conductor and with the metal of said surface of contact of said second conductor at temperatures at which said metals do not alloy with each other, and maintaining contact under alloying conditions for a time sufficient for said mercury to form alloys with the metals of said first conductor and said surface of contact.

2. The method according to claim 1 wherein the metal of said first electrical conductor is sodium.

3. The method according to claim 1 wherein the metal of said first electrical conductor is sodium, and wherein said second electrical conductor is a copper conductor.

4. The method of joining a first electrical conductor of a metal selected from the group consisting of alkali metals, alkaline earth metals and alloys and mixtures thereof with a second electrical conductor having a metallic surface of contact which includes depositing on said surface of contact a layer of mercury which alloys with the metal of said first electrical conductor and with the metal of said surface of contact of said second electrical conductor at temperatures at which said metals do not alloy with each other and bringing said surface of contact, with said mercury deposited thereon, into intimate contact with said first conductor, and maintaining said intimate contact under alloying conditions for a time sufficient for said mercury to form alloys with the metals of said first conductor and said surface of contact.

5. The method according to claim 4 wherein said mercury is deposited on said surface of contact by immersing said surface of contact into an acidic solution of a mercuric salt.

6. The method according to claim 4 wherein the metal of said first electrical conductor is sodium.

7. The method according to claim 5 wherein the metal of said first electrical conductor is sodium.

8. The method according to claim 7 wherein said second electrical conductor is a copper conductor.

References Cited

UNITED STATES PATENTS 3,236,696 2/1966 Andre ------------- 29—502 X

JOHN F. CAMPBELL, *Primary Examiner.*

R. F. DROPKIN, *Assistant Examiner.*